(12) United States Patent
Pugia et al.

(10) Patent No.: US 7,347,617 B2
(45) Date of Patent: Mar. 25, 2008

(54) MIXING IN MICROFLUIDIC DEVICES

(75) Inventors: Michael J. Pugia, Granger, IN (US);
Lloyd S. Schulman, Osceola, IN (US);
Hai Hang Kuo, Granger, IN (US);
Gert Blankenstein, Dortmund (DE)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 63 days.

(21) Appl. No.: 10/643,862

(22) Filed: Aug. 19, 2003

(65) Prior Publication Data

US 2005/0041525 A1    Feb. 24, 2005

(51) Int. Cl.
*B01F 5/06* (2006.01)
*B01F 15/02* (2006.01)

(52) U.S. Cl. ............... 366/341; 422/100; 422/102; 366/DIG. 3

(58) Field of Classification Search ............... 366/341, 366/DIG. 1, DIG. 2, DIG. 3, DIG. 4; 422/100, 422/102
See application file for complete search history.

(56) References Cited

U.S. PATENT DOCUMENTS

| | | | |
|---|---|---|---|
| 3,798,459 A | 3/1974 | Anderson et al. | 250/218 |
| 3,799,742 A | 3/1974 | Coleman | 23/253 R |
| 3,804,533 A | 4/1974 | Scott | 356/197 |
| 3,856,649 A | 12/1974 | Genshaw et al. | 204/195 |
| 3,992,158 A | 11/1976 | Przybylowicz et al. | 23/253 TP |
| 4,233,029 A | 11/1980 | Columbus | 23/230 R |
| 4,310,399 A | 1/1982 | Columbus | 204/195 R |
| 4,446,232 A | 5/1984 | Liotta | 435/7 |
| 4,515,889 A | 5/1985 | Klose et al. | 435/4 |
| 4,534,659 A | 8/1985 | Dourdeville et al. | 366/338 |
| 4,587,220 A | 5/1986 | Mayambala-Mwanika et al. | 436/66 |
| 4,600,507 A | 7/1986 | Shimizu et al. | 210/94 |
| 4,618,476 A | 10/1986 | Columbus | 422/100 |
| 4,647,654 A | 3/1987 | Knowles et al. | 530/326 |
| 4,658,022 A | 4/1987 | Knowles et al. | 530/402 |
| 4,676,274 A | 6/1987 | Brown | 137/806 |
| 4,727,036 A | 2/1988 | Knowles et al. | 436/547 |
| 4,755,472 A | 7/1988 | Ismail et al. | 436/66 |
| 4,756,884 A * | 7/1988 | Hillman et al. | 422/73 |
| 4,806,311 A | 2/1989 | Greenquist | 422/56 |
| 4,908,112 A | 3/1990 | Pace | 204/299 |
| 4,963,498 A * | 10/1990 | Hillman et al. | 422/102 |

(Continued)

FOREIGN PATENT DOCUMENTS

CA    2323424    3/2005

(Continued)

OTHER PUBLICATIONS

Jesse Fowler et al. "Enhancement Of Mixing By Droplet-Based Microfluidics" Mechanical and Aerospace Engineering Dept., University of California. 3 pgs, copyright 2002.

(Continued)

*Primary Examiner*—Tony G Soohoo
(74) *Attorney, Agent, or Firm*—Noam Pollack; Harold Wells (57) ABSTRACT

Mixing of liquids in a microfluidic device is accomplished by dispensing the liquids into a first chamber to produce combined liquid. The liquids are thereafter discharged through at least one capillary from the first chamber into a second chamber for complete mixing.

32 Claims, 2 Drawing Sheets

U.S. PATENT DOCUMENTS

| | | | |
|---|---|---|---|
| 4,968,742 A | 11/1990 | Hillman et al. | 436/69 |
| 4,970,171 A | 11/1990 | Messenger et al. | 436/66 |
| 5,024,647 A | 6/1991 | Jubin et al. | 494/37 |
| 5,053,197 A | 10/1991 | Bowen | 422/58 |
| 5,089,420 A | 2/1992 | Albarella et al. | 436/66 |
| 5,096,836 A | 3/1992 | Macho et al. | 436/169 |
| 5,110,555 A | 5/1992 | Moore et al. | 422/100 |
| 5,141,868 A | 8/1992 | Shanks et al. | 435/288 |
| 5,151,369 A | 9/1992 | Lewis et al. | 436/67 |
| 5,160,702 A | 11/1992 | Kopf-Sill et al. | 422/72 |
| 5,164,598 A | 11/1992 | Hillman et al. | 250/341 |
| 5,180,480 A * | 1/1993 | Manz | 204/644 |
| 5,187,104 A | 2/1993 | Corey et al. | 436/86 |
| 5,202,261 A | 4/1993 | Musho et al. | 435/88 |
| 5,208,163 A | 5/1993 | Charlton et al. | 436/63 |
| 5,222,808 A | 6/1993 | Sugarman et al. | 366/274 |
| 5,250,439 A | 10/1993 | Musho et al. | 435/25 |
| 5,258,311 A | 11/1993 | Lewis et al. | 436/63 |
| 5,279,790 A | 1/1994 | Corey et al. | 422/102 |
| 5,286,454 A | 2/1994 | Nilsson et al. | 422/102 |
| 5,296,192 A | 3/1994 | Carroll et al. | 422/56 |
| 5,318,894 A | 6/1994 | Pugia | 435/28 |
| 5,360,595 A | 11/1994 | Bell et al. | 422/56 |
| 5,372,918 A | 12/1994 | Usui et al. | 430/379 |
| 5,424,125 A | 6/1995 | Ballard et al. | 428/364 |
| 5,443,890 A | 8/1995 | Öhman | 428/167 |
| 5,458,852 A | 10/1995 | Buechler | 422/58 |
| 5,478,751 A | 12/1995 | Oosta et al. | 436/165 |
| 5,585,069 A | 12/1996 | Zanzucchi et al. | 422/100 |
| 5,631,303 A | 5/1997 | Reinecke | 521/40.5 |
| 5,716,741 A | 2/1998 | Reinecke et al. | 430/8 |
| 5,716,851 A | 2/1998 | Pugia et al. | 436/86 |
| 5,826,981 A | 10/1998 | Fowler et al. | 366/337 |
| 5,834,314 A | 11/1998 | Gates et al. | 436/52 |
| 5,837,200 A | 11/1998 | Diessel et al. | 422/73 |
| 5,842,787 A | 12/1998 | Kopf-Sill et al. | 366/340 |
| 5,851,776 A | 12/1998 | Valkirs | 435/7.1 |
| 5,866,345 A | 2/1999 | Wilding et al. | 435/7.21 |
| 5,885,527 A | 3/1999 | Buechler | 422/58 |
| 5,912,134 A | 6/1999 | Shartle | 435/7.24 |
| 5,921,678 A | 7/1999 | Desai et al. | 366/334 |
| 5,922,615 A | 7/1999 | Nowakowski et al. | 436/518 |
| 5,932,315 A | 8/1999 | Lum et al. | 428/172 |
| 5,939,272 A | 8/1999 | Buechler et al. | 435/7.1 |
| 5,942,443 A | 8/1999 | Parce et al. | 436/514 |
| 5,948,227 A | 9/1999 | Dubrow | 204/455 |
| 5,955,028 A | 9/1999 | Chow | 422/63 |
| 5,957,579 A | 9/1999 | Kopf-Sill et al. | 366/340 |
| 5,958,203 A | 9/1999 | Parce et al. | 204/451 |
| 5,958,694 A | 9/1999 | Nikiforov | 435/6 |
| 5,959,291 A | 9/1999 | Jensen | 250/214 R |
| 5,964,995 A | 10/1999 | Nikiforov et al. | 204/450 |
| 5,965,001 A | 10/1999 | Chow et al. | 204/600 |
| 5,965,375 A | 10/1999 | Valkirs | 435/7.2 |
| 5,965,410 A | 10/1999 | Chow et al. | 435/91.2 |
| 5,972,187 A | 10/1999 | Parce et al. | 204/453 |
| 5,976,336 A | 11/1999 | Dubrow et al. | 204/453 |
| 5,985,579 A | 11/1999 | Buechler et al. | 435/7.1 |
| 5,989,402 A | 11/1999 | Chow et al. | 204/601 |
| 5,993,750 A * | 11/1999 | Ghosh et al. | 422/191 |
| 5,994,150 A | 11/1999 | Challener et al. | 436/518 |
| 6,001,231 A | 12/1999 | Kopf-Sill | 204/454 |
| 6,002,475 A | 12/1999 | Boyd et al. | 356/246 |
| 6,004,515 A | 12/1999 | Parce et al. | 422/100 |
| 6,011,252 A | 1/2000 | Jensen | 250/214 R |
| 6,012,902 A | 1/2000 | Parce | 417/48 |
| 6,019,944 A | 2/2000 | Buechler | 422/58 |
| 6,024,138 A | 2/2000 | Fritz et al. | 141/31 |
| 6,030,581 A | 2/2000 | Virtanen | 422/68.1 |
| 6,037,455 A | 3/2000 | Buechler | 530/404 |
| 6,042,709 A | 3/2000 | Parce et al. | 204/453 |
| 6,042,710 A | 3/2000 | Dubrow | 204/454 |
| 6,043,043 A | 3/2000 | Yip | 435/72 |
| 6,046,056 A | 4/2000 | Parce et al. | 436/514 |
| 6,048,498 A | 4/2000 | Kennedy | 422/99 |
| 6,063,589 A | 5/2000 | Kellogg et al. | 435/24 |
| 6,065,864 A | 5/2000 | Evans et al. | 366/167.1 |
| 6,068,752 A | 5/2000 | Dubrow et al. | 204/604 |
| 6,071,478 A | 6/2000 | Chow | 422/81 |
| 6,074,725 A | 6/2000 | Kennedy | 428/188 |
| 6,080,295 A | 6/2000 | Parce et al. | 204/451 |
| 6,082,891 A | 7/2000 | Schubert et al. | 366/338 |
| 6,086,740 A | 7/2000 | Kennedy | 204/601 |
| 6,086,825 A | 7/2000 | Sundberg et al. | 422/100 |
| 6,090,251 A | 7/2000 | Sundberg et al. | 204/453 |
| 6,100,099 A | 8/2000 | Gordon et al. | 436/518 |
| 6,100,541 A | 8/2000 | Nagle et al. | 250/573 |
| 6,106,779 A | 8/2000 | Buechler et al. | 422/55 |
| 6,107,044 A | 8/2000 | Nikiforov | 435/6 |
| 6,113,855 A | 9/2000 | Buechler | 422/58 |
| 6,123,798 A | 9/2000 | Gandhi et al. | 156/292 |
| 6,129,826 A | 10/2000 | Nikiforov et al. | 204/450 |
| 6,130,098 A | 10/2000 | Handique et al. | 436/180 |
| 6,132,685 A | 10/2000 | Kercso et al. | 422/104 |
| 6,136,272 A | 10/2000 | Weigl et al. | 422/82.05 |
| 6,136,610 A | 10/2000 | Polito et al. | 436/514 |
| 6,143,248 A | 11/2000 | Kellogg et al. | 422/72 |
| 6,143,576 A | 11/2000 | Buechler | 436/518 |
| 6,148,508 A | 11/2000 | Wolk | 29/825 |
| 6,149,870 A | 11/2000 | Parce et al. | 422/100 |
| 6,150,119 A | 11/2000 | Kopf-Sill et al. | 435/7.1 |
| 6,150,180 A | 11/2000 | Parce et al. | 436/514 |
| 6,156,270 A | 12/2000 | Buechler | 422/58 |
| 6,170,981 B1 | 1/2001 | Regnier et al. | 366/336 |
| 6,176,119 B1 | 1/2001 | Kintzig | 73/53.01 |
| 6,176,991 B1 * | 1/2001 | Nordman | 422/102 |
| 6,185,029 B1 | 2/2001 | Ishihara | 359/216 |
| 6,186,660 B1 | 2/2001 | Kopf-Sill et al. | 366/340 |
| 6,190,034 B1 | 2/2001 | Nielsen et al. | 366/336 |
| 6,207,000 B1 | 3/2001 | Schwobel et al. | 156/248 |
| 6,213,151 B1 * | 4/2001 | Jacobson et al. | 137/827 |
| 6,235,175 B1 | 5/2001 | Dubrow et al. | 204/453 |
| 6,238,538 B1 * | 5/2001 | Parce et al. | 366/DIG. 3 |
| 6,241,379 B1 | 6/2001 | Larsen | 366/181.5 |
| 6,251,567 B1 | 6/2001 | Reinecke et al. | 427/581 |
| 6,254,754 B1 * | 7/2001 | Ross et al. | 204/548 |
| 6,264,900 B1 | 7/2001 | Schubert et al. | 422/224 |
| 6,268,025 B1 | 7/2001 | Reinecke et al. | 427/581 |
| 6,281,254 B1 * | 8/2001 | Nakajima et al. | 366/DIG. 3 |
| 6,284,113 B1 | 9/2001 | Bjornson et al. | 204/453 |
| 6,287,520 B1 | 9/2001 | Parce et al. | 422/100 |
| 6,296,020 B1 * | 10/2001 | McNeely et al. | 366/DIG. 3 |
| 6,296,126 B1 | 10/2001 | Peters | 210/456 |
| 6,319,469 B1 | 11/2001 | Mian et al. | 422/64 |
| 6,321,791 B1 | 11/2001 | Chow | 137/833 |
| 6,322,683 B1 | 11/2001 | Wolk et al. | 204/600 |
| 6,379,974 B1 * | 4/2002 | Parce et al. | 422/100 |
| 6,399,361 B2 | 6/2002 | Brotherston et al. | 435/283.1 |
| 6,428,664 B1 | 8/2002 | Bhullar et al. | 204/403.03 |
| 6,451,188 B1 * | 9/2002 | Sundberg et al. | 204/453 |
| 6,457,854 B1 | 10/2002 | Koop et al. | 366/336 |
| 6,540,896 B1 * | 4/2003 | Manz et al. | 422/100 |
| 6,582,662 B1 | 6/2003 | Kellogg et al. | 422/72 |
| 6,632,399 B1 | 10/2003 | Kellogg et al. | 422/72 |
| 6,653,625 B2 | 11/2003 | Andersson et al. | 250/288 |
| 6,709,559 B2 * | 3/2004 | Sundberg et al. | 422/100 |
| 6,734,401 B2 | 5/2004 | Bedingham et al. | 219/388 |
| 6,776,965 B2 | 8/2004 | Wyzgol et al. | 422/100 |
| 6,811,752 B2 | 11/2004 | Barbera-Guillem | 422/100 |
| 6,877,892 B2 | 4/2005 | Karp | |
| 6,878,555 B2 | 4/2005 | Andersson et al. | 436/180 |
| 6,919,058 B2 | 7/2005 | Andersson et al. | |
| 2001/0037099 A1 | 11/2001 | Effenhauser | 604/352 |
| 2001/0042712 A1 | 11/2001 | Battrell et al. | 210/511 |

| | | | | | | | |
|---|---|---|---|---|---|---|---|
| 2001/0048637 | A1 | 12/2001 | Weigl et al. ............... 366/341 | WO | WO 00/34781 | A2 | 6/2000 |
| 2001/0048900 | A1 | 12/2001 | Bardell et al. ............. 422/100 | WO | WO 00/34781 | A3 | 6/2000 |
| 2002/0015959 | A1 | 2/2002 | Bardell et al. ................ 435/6 | WO | WO 00/36416 | A1 | 6/2000 |
| 2002/0023684 | A1 | 2/2002 | Chow ....................... 137/833 | WO | WO 01/12329 | A1 | 2/2001 |
| 2002/0048535 | A1 | 4/2002 | Weigl et al. ............... 422/100 | WO | WO 01/14063 | A1 | 3/2001 |
| 2002/0058332 | A1 | 5/2002 | Quake et al. ........... 435/288.3 | WO | WO 01/14116 | A1 | 3/2001 |
| 2002/0076300 | A1 | 6/2002 | Patterson, Jr. ................ 411/92 | WO | WO 01/19586 | A1 | 3/2001 |
| 2002/0076350 | A1 | 6/2002 | Weigl et al. ................. 422/58 | WO | WO 01/24931 | A1 | 4/2001 |
| 2002/0079219 | A1 | 6/2002 | Zhao et al. ................ 204/451 | WO | WO 01/54810 | A1 | 8/2001 |
| 2002/0097532 | A1 | 7/2002 | Voldman .................... 360/323 | WO | WO 02/18053 | A1 | 3/2002 |
| 2002/0097632 | A1 | 7/2002 | Kellogg et al. ............. 366/220 | WO | WO 02/28532 | A2 | 4/2002 |
| 2002/0097633 | A1 | 7/2002 | O'Connnor et al. ......... 366/336 | WO | WO 02/28532 | A3 | 4/2002 |
| 2002/0112961 | A1 | 8/2002 | O'Connor et al. ........... 204/601 | | | | |
| 2002/0114738 | A1 | 8/2002 | Wyzgol et al. .............. 422/100 | | | | |

FOREIGN PATENT DOCUMENTS

| | | |
|---|---|---|
| EP | 0 693 560 A1 | 1/1996 |
| EP | 1 013 341 A2 | 6/2000 |
| EP | 1 013 341 A3 | 1/2001 |
| EP | 0 871 539 B1 | 2/2002 |
| EP | 1 013 341 B1 | 12/2003 |
| WO | WO 95/17965 | 7/1995 |
| WO | WO 97/00121 | 1/1997 |
| WO | WO 97/01055 | 1/1997 |
| WO | WO 99/46045 A1 | 9/1999 |
| WO | WO 00/21728 | 4/2000 |
| WO | WO 00/22436 | 4/2000 |
| WO | WO 00/25921 | 5/2000 |

OTHER PUBLICATIONS

Whitesides et al.—Physics Today Online, Apr. 11, 2003, pgs.
R. W. Barber et al. Rapid Mixing Devices For Life Science App. 3 pgs, no date.
Laminar and turbulent flow, no date.
David C. Duffy et al.—Anal. Chem. 1999, 71, pp. 4669-4678.
Walters et al: "Fluiddynamsiche Aspekte in Mikrostruktur-reaktoren" Chemie. Ingenieur. Technik, Verlag Chemie GMBH. Weinheim, DE, vol. 71, No. 5, May 1999, pp. 447-455, XPOOO828911 ISSN: 0009-286X.
Walter et al.; "Fluid Dynamic Aspects of Microreactors," *Chemical Engineer Technology*, vol. 71 (5), pp. 447-455, 1999.

* cited by examiner

MIXING IN MICROFLUIDIC DEVICES

BACKGROUND OF THE INVENTION

This invention relates generally to microfluidic devices, particularly to devices used for analysis of biological samples, such as blood, urine and the like. These microfluidic devices bring small amounts of a liquid sample into contact with reagents to provide a qualitative or quantitative measure of the presence or absence of an analyte of interest. Typically, a measured amount of the sample is moved through one or more chambers containing reagents or conditioning agents used to prepare the sample for contacting the reagents. The amount of the sample is usually less than 10 µL and the chambers are of a similar size. They are interconnected by capillary passageways through which the sample moves by capillary forces or by an applied force, such as centrifugal force.

In many cases, it is necessary to contact the sample with a conditioning liquid in order to dilute the sample or otherwise prepare the sample for subsequent reaction. For example, assays often require a sample be contacted to minimize interference, to control reaction conditions such as pH, co-factors or ionic strength, to form complexes such as multi-dentate ligands, proteins such as antibody-antigen complexes, nucleic acids, polycarbohydrates, lipids or metals, to lysis cells e.g. bacteria, red blood cells or white blood cells, and to react analytes and metabolites into detectable form. Mixing of the sample with a conditioning liquid presents problems related to the small size of the microfluidic device. Movement of small amounts of liquids through narrow passageways by capillary forces involves the interaction of the liquid with the walls of the passageways. If the liquid is aqueous, which is typical of biological samples, and the walls of the passageway are hydrophilic and narrow, for example 200 to 200 µm wide and 1 to 200 µm deep, the surface energy of the liquid creates a force which can move the liquid through the passageway. The large surface to volume ratio means that the surface effects on the liquid are large. The Reynolds Number, a dimensionless unit which is related to the character of the liquid flow, is very low, indicating that the liquid flow is laminar, and not turbulent. Laminar flow is streamline flow, with the velocity increasing with the distance from the wall.

Mixing of a sample with conditioning liquids is difficult when laminar flow predominates. Mixing is usually done by creating turbulent conditions. In much of the prior art relating to microfluidics, liquids in laminar flow are brought into close contact, relying on diffusion of molecules from one layer of liquid to another to create a mixture of the liquids. In active micro mixers that use macro scale techniques e.g., mechanical stirring, including active elements can require very complex and costly devices.

In U.S. Pat. No. 6,136,272, Weigl et al disclose a device that creates two or more shallow laminar layers to facilitate the diffusion of molecules from one layer to an adjacent layer. The patentees stated that their device was designed so that the Reynolds Number is below 1, preferably less than 0.1. They observed that when the Reynolds Number is greater than 1, flow can be laminar, but that such systems are prone to developing turbulence when the flow pattern is disturbed. Thus, the patentees system was designed to assure laminar flow with diffusional mixing. Enhanced diffusion is created between parallel streams in laminar flow in another U.S. Published Patent Application 2002/0076300 (Weigl et al.).

U.S. Published Patent Application 2002/0097532 disclosed a disc containing many channels. Two liquids were passed through a zig-zag channel in laminar flow while the disc was rotated, with mixing said to occur by diffusion.

A T-Sensor is shown in U.S. Published Patent Application 2001/0042712. The sensor contacts a liquid sample with an indicator liquid, the streams flowing in parallel laminar flow with diffusion between them.

U.S. Published Application 2001/0048637 discloses a similar device, which overcomes the "butterfly effect" caused by greater diffusion at the walls than in the center of the parallel laminar flow streams.

U.S. Published Application 2002/0076350 illustrates another method of improving diffusion between laminar flow streams. Parallel laminar flow streams were moved through 90° turns to change the aspect ratio of the streams, thereby improving diffusion between the streams.

Micro-mixers are described in U.S. Pat. No. 6,190,034 B1 and U.S. Pat. No. 6,241,379 B1. Liquids are mixed by creating thin layers to facilitate mixing by diffusion.

The patents and applications discussed above are related to passing a reagent stream adjacent to a sample stream so that by diffusion a reaction occurs and then is measured. In other patents and applications mixing is attempted by various means, despite the liquids being in laminar flow.

In U.S. Published Application 2001/0048900 mixing separate streams by creating a vortex in a chamber. In some embodiments, the inventors indicate that a Reynolds number of 320 is achieved and the first and second fluids have Reynolds numbers between 1 and 2000. Therefore, the flow is in a region between laminar flow and turbulent flow.

U.S. Pat. No. 5,921,678 discloses a liquid mixer in which two streams of liquid meet head-on and exit together in a channel at 90° from the entrance channels. The Reynolds number of the streams is said to be 2000-6000. Sharp-edged pillars are shown to assist in generating turbulence at the intersection of the mixing streams.

U.S. Published Application 2002/0048535 shows a device in which two liquids are combined during rotation of the device to transfer the liquids from one container to another.

U.S. Pat. No. 6,264,900 provides mixing of parallel laminar flow streams for carrying out fast chemical reactions.

U.S. Pat. No. 6,065,864 discloses a micro-mixing system including bubble-controlled pumps and valves to establish circulating flow in a mixing chamber.

The present inventors wished to provide effective mixing of liquid reagents or conditioning liquids with sample fluids in microfluidic devices. Such mixing is made difficult by the mismatch between the viscosity and volume of the liquids to be mixed. Their solution to the problem will be described in detail below.

SUMMARY OF THE INVENTION

Liquids are mixed in microfluidic devices by a method in which at least two liquids are dispensed into a first chamber to combine the liquids. In a preferred embodiment, the liquids are dispensed into the first chamber from wells containing the liquids. In a second step, the combined liquids are discharged from the first chamber through at least one capillary passageway into a second chamber to mix the liquids. In some embodiments, two or more parallel capillary passageways are used. In another embodiment, the second chamber is in liquid communication with at least a third mixing chamber through at least one capillary passageway.

Mixing of liquids results when they enter and leave chambers that are large relative to the narrow channels through which they enter and leave. The disturbance in the flow pattern of the liquids is considered to be responsible for the mixing that is observed to occur. In some instances, droplets have been observed to form when the liquids exit from a capillary passageway into a large chamber. Such droplets may contribute to mixing as they coalesce within the chamber.

The mixing process is completed by forcing the liquids in the first chamber through one or more capillary passageways into the second chamber. In microfluidic devices using the method of the invention, the capillary passageways have cross-sectional dimensions between 1 and 2000 µm, preferably 200 to 1000 µm, or as may be required by the properties of the liquids. The length of the capillaries between the two chambers will be between 0.5 to 100 mm, preferably 1-50 mm. The cross-sectional shape of the capillary passageways is not believed to be critical. Typically, the passageways have a rectangular cross-section, but the shape will be determined by the method used to form the passageways. The dimensions in a typical design will be chosen to provide a liquid velocity of 1 mm/sec or more in the passageways, taking into account the liquid viscosity and applied force.

Each of the two chambers is larger than the total volume of the liquids being mixed. Preferably, the volume of each chamber is about two times larger than the volume of the combined liquids or more. The depth of each chamber is sufficient to provide free space above the liquids after they have entered the chamber. Preferably, the space above the liquid will be sufficient to allow the liquid entering the chamber to separate into droplets, e.g. about 100 µm or more. More preferably, the depth of the chamber will have about twice the depth needed to hold the volume of combined liquids being mixed. The capillary passageways preferably are located in the free space above the liquid in the chambers.

DESCRIPTION OF THE PREFERRED EMBODIMENTS

Flow in Microchannels

The microfluidic devices employing the invention typically use channels having cross-sectional dimensions in the range of about 1 to 2000 µm, preferably about 200-1000 µm. When the channels have a cross-section that is generally rectangular, the dimension may refer to the diagonal of the rectangle. The minimum dimension for such channels is believed to be about 5 µm for many practical applications, since smaller channels may effectively filter out components in the sample being analyzed. Where not a problem, smaller dimensions may be used. Channels in the preferred range make it possible to move liquid samples by capillary forces alone. It is also possible to stop movement by capillary walls that have been treated to become hydrophobic relative to the sample fluid or by marked changes in the channel dimensions. Resistance to flow can be overcome by applying a pressure difference, for example, by pumping, vacuum, electroosmosis, heating, absorbent materials, additional capillarity or centrifugal force. As a result, liquids can be metered and moved from one region of the device to another as required for the analysis being carried out in microfluidic device.

A mathematical model can be used to relate the pressure difference (e.g. centrifugal force), the fluid physical properties, the fluid surface tension, the surface energy of the capillary walls, the capillary size and the surface energy of particles contained in fluids to be analyzed. It is possible to predict the flow rate of a fluid through the capillary and the desired degree of hydrophobicity or hydrophilicity. The following general principles can be drawn from the relationship of these factors.

For any given passageway, the interaction of a liquid with the surface of the passageway may or may not have a significant effect on the movement of the liquid. When the surface to volume ratio of the passageway is large i.e. the cross-sectional area is small, the interactions between the liquid and the walls of the passageway become very significant. This is especially the case when one is concerned with passageways with nominal diameters less than about 200 µm, when capillary forces related to the s surface energies of the liquid sample and the walls predominate. When the walls are wetted by the liquid, the liquid moves through the passageway without external forces being applied. Conversely, when the walls are not wetted by the liquid, the liquid attempts to withdraw from the passageway. These general tendencies can be employed to cause a liquid to move through a passageway or to stop moving at the junction with another passageway having a different cross-sectional area. If the liquid is at rest, then it can be moved by a pressure difference, such as by applying centrifugal force. Other means could be used, including air pressure, vacuum, electroosmosis, heating, absorbent materials, additional capillarity and the like, which are able to apply the needed pressure difference at the junction between passageways having different cross-sectional areas or surface energies. In the present invention high capillary forces are available, making it possible to move liquids by capillary forces alone, without requiring external forces, except for short periods when a capillary stop must be overcome. However, the smaller passageways inherently are more likely to be sensitive to obstruction from particles in the biological samples or the reagents. Consequently, the surface energy of the passageway walls is adjusted as required for use with the sample fluid to be tested, e.g. blood, urine, and the like. This feature allows more flexible designs of analytical devices to be made.

Microfluidic Analytical Devices

The analytical devices of the invention may be referred to as "chips". They are generally small and flat, typically about 1 to 2 inches square (25 to 50 mm square) or disks having a radius of about 40 to 80 mm. The volume of samples will be small. For example, they will contain only about 0.1 to 10 µL for each assay, although the total volume of a specimen may range from 10 to 200 µL. The chambers holding the sample fluids and reagents typically will be relatively wide and shallow in order that the samples can be easily seen and changes resulting from reaction of the samples can be measured by suitable equipment. The interconnecting capillary passageways typically will have a cross-sectional dimension in the range of 1 to 2000 µm, preferably 200 to 500 µm. The shape will be determined by the method used to form the passageways but passageways having rectangular cross-sections are preferred. The depth of the passageways will be at least 5 µm in many practical applications where samples contain particles, but may be smaller where the nature of the sample permits.

While there are several ways in which the capillaries and chambers can be formed, such as injection molding, laser ablation, diamond milling or embossing, it is preferred to use injection molding in order to reduce the cost of the chips. Generally, a base portion of the chip will contain the desired network of chambers and capillaries. After reagent compounds have been placed in the chambers as desired, a top portion will be attached over the base to complete the chip.

The chips usually are intended to be disposable after a single use. Consequently, they will be made of inexpensive materials to the extent possible, while being compatible with the reagents and the samples which are to be analyzed. In most instances, the chips will be made of plastics such as polycarbonate, polystyrene, polyacrylates, or polyurethene, alternatively, they can be made from silicates, glass, wax or metal.

The capillary passageways will be adjusted to be either hydrophobic or hydrophilic, properties which are defined with respect to the contact angle formed at a solid surface by a liquid sample or reagent. Typically, a surface is considered hydrophilic if the contact angle of water on the surface is less than 90 degrees and hydrophobic if the contact angle is greater than 90°. Preferably, the surface energy is adjusted by plasma induced polymerization at the surface of the passageways. The analytical devices of the invention may also be made with other methods used to control the surface energy of the capillary walls, such as coating with hydrophilic or hydrophobic materials, grafting, or corona treatments. The surface energy of the capillary walls may be adjusted for use with the intended sample fluid. For example, to prevent deposits on the walls of a hydrophobic passageway or to assure that none of the liquid is left in a passageway. For most passageways in the microfluidic devices of the invention, the surface is generally hydrophilic since the liquid tends to wet the surface and the surface tension forces causes the liquid to flow in the passageway. For example, the surface energy of capillary passageways is adjusted so that the contact angle of water on the surface is between 10° to 60° when the passageway is to contact whole blood or a contact angle of water on the surface of 25° to 80° when the passageway is to contact urine.

Movement of liquids through the capillaries may be prevented by capillary stops, which, as the name suggests, prevent liquids from flowing through the capillary. If the capillary passageway is hydrophilic and promotes liquid flow, then a hydrophobic capillary stop can be used, i.e. a smaller passageway having hydrophobic walls. The liquid is not able to pass through the hydrophobic stop because the combination of the small size and the non-wettable walls results in a surface tension force which opposes the entry of the liquid. Alternatively, if the capillary is hydrophobic, no stop is necessary between a chamber and the capillary. The liquid in the chamber is prevented from entering the capillary until sufficient force is applied, such as by centrifugal force, to cause the liquid to overcome the opposing surface tension force and to pass through the hydrophobic passageway. However, centrifugal force is only needed to start the flow of liquid. Once the walls of the hydrophobic passageway are fully in contact with the liquid, the opposing force is reduced because presence of liquid lowers the energy barrier associated with the hydrophobic surface. Consequently, the liquid no longer requires centrifugal force in order to flow. While not required, it may be convenient in some instances to continue applying centrifugal force while liquid flows through the capillary passageways in order to facilitate rapid analysis.

When a hydrophobic stop is located in a hydrophilic capillary, a pressure difference must be applied to overcome the effect of the hydrophobic stop. In general, the pressure difference needed is a function of the surface tension of the liquid, the cosine of its contact angle with the hydrophilic capillary and the change in dimensions of the capillary. That is, a liquid having a high surface tension will require less force to overcome a hydrophobic stop than a liquid having a lower surface tension. A liquid which wets the walls of the hydrophilic capillary, i.e. it has a low contact angle, will require more force to overcome the hydrophobic stop than a liquid which has a higher contact angle. The smaller the hydrophobic channel, the greater the force which must be applied.

When the capillary passageways are hydrophilic, a sample liquid (presumed to be aqueous) will naturally flow through the capillary without requiring additional force. If a capillary stop is needed, one alternative is to use a narrower hydrophobic section which can serve as a stop as described above. A hydrophilic stop can also be used, even through the capillary is hydrophilic. Such a stop is wider and deeper than the capillary forming a "capillary jump" and thus the liquid's surface tension creates a lower force promoting flow of liquid. If the change in dimensions between the capillary and the wider stop is sufficient, then the liquid will stop at the entrance to the capillary stop. It has been found that the liquid will eventually creep along the hydrophilic walls of the stop, but by proper design of the shape this movement can be delayed sufficiently so that stop is effective, even though the walls are hydrophilic.

In order to design chips in which centrifugal force is applied to overcome hydrophilic or hydrophobic stops empirical tests or computational flow simulation can be used to provide useful information enabling one to arrange the position of liquid-containing chambers on chips and size the interconnecting capillary channels so that liquid sample can be moved as required by providing the needed force by adjusting the rotational speed.

Microfluidic devices can take many forms as needed for the analytical procedures which measure the analyte of interest. The microfluidic devices typically employ a system of capillary passageways connecting chambers containing dry or liquid reagents or conditioning materials. Analytical procedures may include preparation of a metered sample by diluting the sample, prereacting the analyte to ready it for subsequent reactions, removing interfering components, mixing reagents, lysising cells, capturing bio molecules, carrying out enzymatic reactions or incubating for binding events, staining, or deposition. Such preparatory steps may be carried out before or during metering of the sample, or after metering but before carrying out reactions which provide a measure of the analyte.

In such analytical procedures a sample will be combined with a conditioning liquid or with a reagent liquid and then transferred to a mixing chamber before being sent to subsequent processing. It will be evident that intimate mixing of the sample with the reagent or conditioning liquid is important to accurate and reproducable results. As is well known, the flow in microfluidic devices is typically laminar, that is, the viscosity of the liquid has a greater effect than the inertia of the flowing liquid so that the liquid flows linearly without being turbulent. One consequence of laminar flow conditions is that mixing of two or more liquids is slow since it principally results from molecular diffusion. As discussed above, some microfluidic devices have been designed to improve diffusion between layers of liquids in laminar flow. Many of these devices do not intend that complete mixing occurs, but in others provision for close contacting of liquid streams is provided.

In the present invention, complete mixing is wanted. It has been found that through mixing can be achieved by proper design of the device so that uniform mixtures are produced combining liquid samples with liquid reagents or conditioning agents that have differing viscosities and volumes.

Mixing of Liquids

If accurate analytical results are to be obtained, mixing of samples with larger volumes of liquid reagents or conditioning liquids is important. Although thorough mixing has been shown to occur in the combination of chambers and capillaries that are described here, the process by which the mixing occurs is not fully understood. Much of the prior art presumes that laminar flow prevents efficient mixing and therefore emphasizes creation of thin layers of liquid flowing in parallel to facilitate diffusional mixing. The present inventors believe that in their methods, localized effects occur that benefit mixing, but are difficult to measure. When liquids pass through capillaries, they are in laminar flow; therefore, one would expect that little mixing occurs. However, as liquids enter and exit capillaries connecting relatively large chambers it is probable that some localized eddies or disturbancies are created as the liquids speed up or slow down and flow around distinct edges. Thus, while the flow may be nominally laminar in nature, the effects created at the intersection of walls of the capillaries and chambers with the liquid may contribute to mixing of the liquids. Furthermore, energy is added to the liquids by the application of centrifugal (or other) force to force the liquids to overcome capillary stops. The liquids will be accelerated and decelerated as they move from their initial positions through capillaries into large chambers. It has been observed that droplets often form as the liquids exit from capillaries. Forming droplets that combine different liquids may induce mixing of the liquids. Combining the individual droplets is presumed to provide further mixing in a process analogous to layering. That is, if two incompatible liquids are combined by successively dividing and layering them, ultimately the layers become so thin as to be indistinguishable. Thus, if thousands of droplets are combined, any separation of the two liquids is not evident and the liquids are effectively completely mixed. Also, a certain degree of mixing by molecular diffusion is presumed to occur as the subdivision of the liquids proceeds and the distance which molecules must move is reduced. While the degree of mixing may be determined after it has occurred, the design of the necessary microfluidic features will vary depending on the relative volumes of the liquids to be mixed and on their physical properties and may require experimental confirmation.

This general description of the mixing process applies to various liquids. However, the conditions used require modification depending on the viscosity and relative volumes of the liquids being mixed. It will be evident that mixing a viscous liquid with one that is much less viscous will be more difficult than mixing two liquids having similar low viscosities. Mixing two viscous liquids also will be difficult to do uniformly. Combining two liquids having significantly different volumes would be expected to more difficult than mixing liquids of equal volumes.

It has been found that certain parameters can be used to define the conditions needed for producing mixing of liquids according to the invention. In general, two or more liquids are combined in a first chamber, which is emptied through at least one connecting capillary passageway into a second chamber, where the liquids complete the mixing process. One such process is shown in a simplified diagram in FIG. 1, discussed below. Movement of the liquids typically requires application of force to overcome the resistance to flow inherent in the use of small passageways and that resulting from capillary stops added to prevent liquids from flowing. Centrifugal force is often used for this purpose, but other methods which can produce the needed force may be used, including air pressure, vacuum, electroosmosis, absorbent materials, additional capillarity and the like. The force applied is sufficient to create a flow of liquid in the capillary passageways of 1 mm/sec or more. These passageways have cross-sectional dimensions between 1 µm and 2000 µm, preferably 200 to 1000 µm, as determined by the physical properties of the liquids. The passageways will have a length between 0.5 and 100 mm, preferably 1-50 mm, depending on the arrangement of chambers and passageways on the chip. The difference in dimensions between those of the capillary passageways and the associated chambers is so large that the movement of liquids from one chamber to another creates a disturbance in the flow. Further, the surface tension of the liquids is believed to be responsible for the droplets which have been observed to form at the point where liquids exit the capillary passageways and enter a larger chamber for mixing. The droplets are forced to the outside of the receiving chamber by centrifugal force (in the typical case), where they recombine.

The chambers may be various shapes, but typically they will be generally circular or square. They may contain internal features such as steps or ramps. Such features are believed to have a minor effect on mixing of the liquids, although they may be included for other reasons. It is considered important that sufficient space be provided in the mixing chambers above the liquids being mixed. At least 100 µm free space is believed to be needed in a typical chamber containing about 0.1 to 50 µL. Preferably, the chambers will have a volume about twice that of the total volume of the liquids being mixed and the depth of the chambers will be about twice that of the liquid level in the chamber. Larger chambers and greater depths are assumed to provide improve mixing, but may not be optimum. Smaller chambers and smaller depths may provide satisfactory results, although it is expected that mixing will be impaired as less air space above the liquids is available.

Figure 1A:
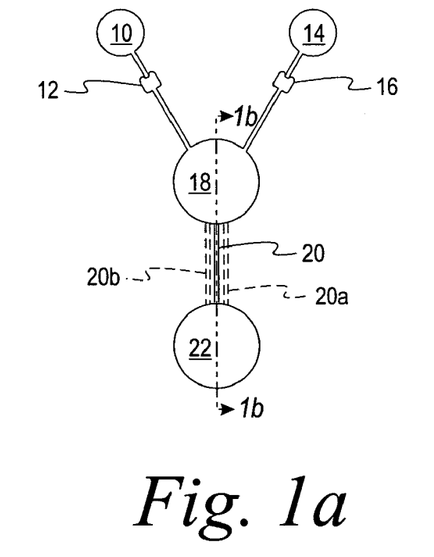
FIG. 1 illustrate mixing of two liquids according to the invention.
Figure 1B:
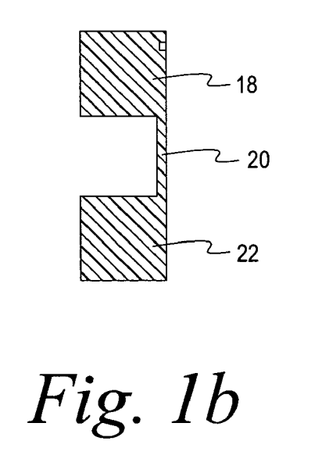

FIGS. 1A&B show mixing according to the invention in a simplified form such as will occur in microfluidic devices. A sample liquid in container 10 is retained in container 10 until released by applying force e.g., centrifugal force to overcome capillary stop 12. Similarly, a liquid reagent or a conditioning liquid e.g., a buffer solution remains in container 14 by a capillary stop 16 until the necessary force has been applied. The two liquids flow through capillaries into first chamber 18. Chamber 18 receives the sample and the second liquid at the same time so that preliminary mixing occurs, as the liquids enter chamber 18. In most cases, the mixing is not adequate and a second step is needed. The combined liquids leave first chamber 18 through at least one capillary passageway 20 and enter the second mixing chamber 22. The liquid may form small droplets as it leaves capillary 20 and enters the mixing chamber, thereby mixing the liquids within the droplets as they are formed. Further mixing is accomplished as the droplets recombine at the bottom of the mixing chamber 22.

In another embodiment of FIG. 1, three capillary passageways e.g., 20, 20a and 20b are used to connect the first chamber 18 to the second mixing chamber 22. More than three capillaries may be used, as in Example 1 below. Preferably, the capillaries will not have the same diameter so that the velocity in the capillaries varies, producing different sized droplets, and further improving mixing. If multiple capillaries are used, they may be arranged to cause the exiting liquids to meet within chamber 22.

Figure 2A:
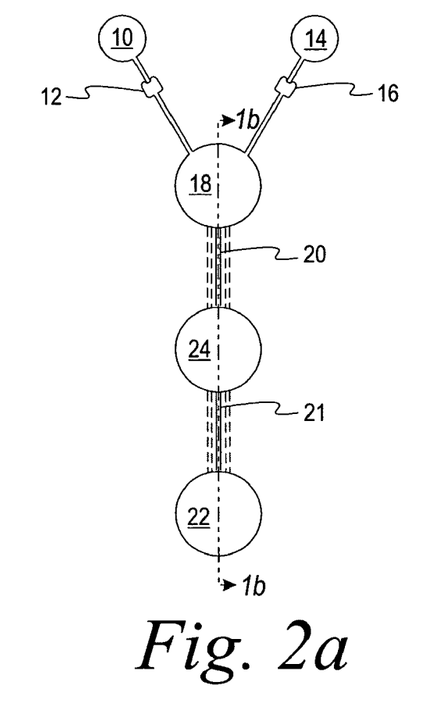
FIG. 2 shows an alternative embodiment of the invention.
Figure 2B:
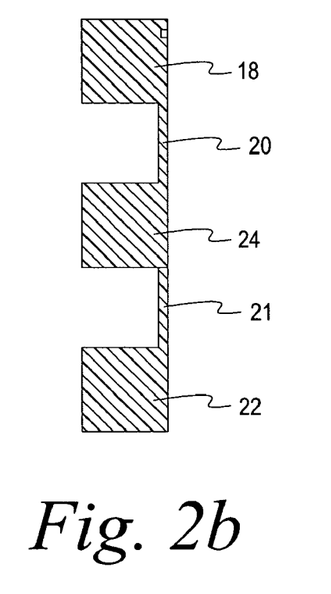

Another alternative shown in FIG. 2A&B is particularly useful when liquids having different viscosities are being mixed. The capillaries 20 et al would discharge into a premixing chamber 24, from which additional capillaries 21 et al would carry the combined liquids to the mixing chamber 22. Additional pre-mixing chambers could be provided to further improve mixing. In both sectional views, FIG. 1B and FIG. 2B, it can be seen that the capillary passageways 20 and 21 typically will be positioned at the top of a chip containing the deeper chambers. Thus, when force is applied to the liquids, they move up to the passageways and then enter the next chamber.

Having described several embodiments found to provide effective mixing in practice, it will be understood that certain variants suggest themselves for consideration in particular cases. One alternative would be to combine the capillaries supplying the separate liquids before entering the first chamber. This would have the advantage of creating a degree of mixing in the combined capillary as the liquid velocity increases, which would lead to more mixing created by the entry to the chamber. Then too, the first chamber could be provided with microstructures to create localized eddies or disturbancies to improve mixing. In the simplest case, the liquids could be deposited directly in the first chamber 18 rather than being first placed in wells 10 and 14.

It has already been suggested that when multiple capillaries are used to supply the liquids to the second mixing chamber, the capillaries could have different diameters and that they could be arranged to impinge as the liquid streams/droplets enter the mixing chamber. Another alternative would be to manifold the several capillaries before entering the second mixing chamber to obtain the advantages associated with entrance created eddies and changes in liquid velocity. The second mixing chamber could also be provided with microstructures to assist mixing.

The microfluidic device illustrated in FIG. 3 will be described in Example 3 as used in a particular analytical procedure. The device mixes a liquid in chamber 18 with a metered sample contained in capillary 14 and chamber 16. The liquids are received in chamber 20 and transferred to mixing chamber 30, from which the mixed liquids flow out for analysis.

Another aspect of the invention relates to the movement of mixed liquids to downstream chambers for further processing. It will be evident that mixing should be completed before the liquids are moved. Several possible means for preventing premature movement of the liquids before mixing is complete have been considered. In one method, the mixed liquids enter a capillary positioned above the normal depth of the liquid in the mixing well. It has been found that, after centrifugal force holding the liquid in position in the mixing chamber is reduced, the liquid tends to creep up along the walls of the chamber and can reach the exit capillary. In a second method, the exit capillary is entered from below the level of liquid in the mixing chamber but not until the resistance of a hydraulic stop is overcome by application of the necessary force. In a third method, the exit capillary is located above the liquid depth in the mixing chamber and the natural tendency for the liquid to move by capillary forces is assisted by providing microstructures, for example a grooved ramp leading to the exit capillary.

Applications

Microfluidic devices have many applications. Analyses may be carried out on samples of many biological fluids, including but not limited to blood, urine, water, saliva, spinal fluid, intestinal fluid, food, and blood plasma. Blood and urine are of particular interest. A sample of the fluid to be tested is deposited in the sample well and subsequently measured in one or more metering capillaries or wells into the amount to be analyzed. The metered sample will be assayed for the analyte of interest, including for example a protein, a cell, a small organic molecule, or a metal. Examples of such proteins include albumin, HbA1c, protease, protease inhibitor, CRP, esterase and BNP. Cells which may be analyzed include *E.coli, pseudomonas*, white blood cells, red blood cells, *h.pylori*, strep a, chlamdia, and mononucleosis. Metals which may be detected include iron, manganese, sodium, potassium, lithium, calcium, and magnesium.

In many applications, color developed by the reaction of reagents with a sample is measured. Other spectroscopic analysis of the sample are possible, using sensors positioned for detecting absorbance, reflectance, transmission and emission such as fluorescence, phosphorescence, luminescence, and other changes in the near and far infrared, Raman, and ultraviolet wavelengths. It is also feasible to make electrical measurements of the sample, using electrodes positioned in the small wells in the device. Examples of such analyses include electrochemical signal transducers based on amperometric, impedimetric, potentimetric detection methods. Examples include the detection of oxidative and reductive chemistries and the detection of binding events.

There are various reagent methods which could be used in microfluidic devices. Reagents undergo changes whereby the intensity of the signal generated is proportional to the concentration of the analyte measured in the clinical specimen. These reagents contain indicator dyes, metals, enzymes, polymers, antibodies, electrochemically reactive ingredients and various other chemicals dried onto carriers. Carriers often used are papers, membranes or polymers with various sample uptake and transport properties. They can be introduced into the reagent chambers in the microfluidic devices.

A number of uses for reagents are possible. For example, an analyte can be reacted with reagent in a first chamber and then the reacted reagent directed to a second chamber for further reaction. Also, a reagent can be re-suspended in a liquid in a first chamber and moved to a second chamber for a reaction. An analyte or reagent can be trapped in a first or second chamber and a determination of free versus bound reagent be made. A third liquid reagent can be used to wash materials trapped in the second chamber and to move materials to the waste chamber.

The determination of a free versus bound reagent is particularly useful for multizone immunoassay and nucleic acid assays. There are various types of multizone immunoassays that could be adapted to these devices. In the case of adaption of immunochromatography assays, reagents and filters are placed into separate chambers and do not have to be in physical contact as chromatographic forces are not in play. Immunoassays or DNA assay can be developed for detection of bacteria such as Gram negative species (e.g. *E. Coli, Entereobacter, Pseudomonas, Klebsiella*) and Gram positive species (e.g. *Staphylococcus Aureus, Entereococc*). Immunoassays can be developed for complete panels of proteins and peptides such as albumin, hemoglobin, myoglobulin, α-1-microglobulin, immunoglobulins, enzymes, glycoproteins, protease inhibitors, drugs and cytokines. See, for examples: Greenquist in U.S. Pat. No. 4,806,311, Multizone analytical Element Having Labeled Reagent Concentration Zone, Feb. 21, 1989, Liotta in U.S. Pat. No. 4,446,232, Enzyme Immunoassay with Two-Zoned Device Having Bound Antigens, May 1, 1984.

Potential applications where dried reagents are resolubilized include, filtration, sedimentation analysis, cell lysis, cell sorting (mass differences) and centrifugal separation. Enrichment (concentration) of sample analyte on a solid phase (e.g. microbeads) can be used to improved sensitivity. The enriched microbeads could be separated by continuous centrifugation. Multiplexing can be used (e.g. metering of a variety of reagent chambers in parallel and/or in sequence) allowing multiple channels, each producing a defined discrete result. Multiplexing can be done by a capillary array comprising a multiplicity of metering capillary loops, and fluidly connected with the entry port, or an array of dosing channels and/or capillary stops connected to each of the metering capillary loops. Combination with secondary forces such as magnetic forces can be used in the device design. Particle such as magnetic beads used as a carrier for reagents or for capturing of sample constituents such as analytes or interfering substances. Separation of particles by physical properties such as density (analog to split fractionation).

Example 3 below illustrates the invention used in carrying out an assay for measuring the glycated hemoglobin (HcA1c) content of a patient's blood which can indicate the condition of diabetic patients. The method used has been the subject of a number of patents, most recently U.S. Pat. No. 6,043,043. Normally the concentration of glycated hemoglobin is in the range of 3 to 6 percent. But, in diabetic patients it may rise to a level about 3 to 4 times higher. The assay measures the average blood glucose concentration to which hemoglobin has been exposed over a period of about 100 days. Monclonal antibodies specifically developed for the glycated N-terminal peptide residue in hemoglobin Alc are labeled with colored latex particles and brought into contact with a sample of blood to attach the labeled antibodies to the glycated hemoglobin. Before attaching the labeled antibodies, the blood sample is first denatured by contact with a denaturant/oxidant e.g. lithium thiocyanate as described in Lewis U.S. Pat. No. 5,258,311. Then, the denatured and labeled blood sample is contacted with an agglutinator reagent and the turbidity formed is proportional to the amount of the glycated hemoglobin present in the sample. The total amount of hemoblobin present is also measured in order to provide the percentage of the hemoglobin which is glycated. The mixing of the blood sample with the denaturant/oxidant is carried out in accordance with the present invention.

EXAMPLE 1

A microfluidic device was made having the general configuration shown in FIG. 1, including five parallel capillaries 20 et al connecting chambers 18 and 22.

The sample well 10 was filled with 10 μL of a phenol red solution with buffer (pH 4.0). The well 14 was filled with 10 μL of a solution of phenol red (pH 7.0). 10 mm long capillaries connected the sample and reagent chambers to the first chamber 18. Each capillary was 200 μm deep and 700 μm wide, containing 0.4 μL. The first chamber 18 was 5.5 mm in diameter, 1.5 mm deep, and had a capacity of about 36 μL. The second chamber 22 was 5.5 mm in diameter and 1.1 mm deep, with a capacity of about 26 μL. The device was placed on a platform and rotated at 2500 rpm at a distance of about 28 mm to overcome the resistance of the stops 12 and 16 and to deliver the liquids from wells 10 and 14 at the same time to first chamber 18. The mixed liquids passed immediately through five capillary passageways (20 et al) connecting first chamber 18 and the second chamber 22. Each capillary was 3.5 mm long, 200 μm deep, and 200 μm wide. The color of the liquid collected in second chamber 22 was uniformly yellow, indicating complete mixing had occurred.

It was found that once the centrifugal force was removed, the liquid moved up along the sides of second mixing chamber 22, so the exiting capillaries (not shown in FIG. 1) could be filled.

EXAMPLE 2

Another microfluidic device was made, which differed from the device of Example 1 in that only one capillary passageway connected the first chamber 18 and the second chamber 22. Also, the second chamber 22 was provided with a series of five steps ramped down in the direction of the centrifugal force that was applied. The first chamber 18 was 5.5 mm in diameter, 1.5 mm deep, and had a capacity of about 36 μL. The second chamber 22 was 5 mm wide and 7 mm long with an average depth of about 1.2 mm and a volume of about 46 μL. The single capillary (3 mm long, 200 μm deep, 500 μm wide) exited at the top of the stepped ramp. The mixing chamber and the two capillaries supplying the dilution chamber had the same dimensions as in Example 1.

10 μL of a phenol red solution (pH 7.0) was added to well 10 and 10 μL of phenol red solution with buffer (pH 4.0) was added to well 14. The device was rotated at a speed which was sufficient to overcome the capillary stops and deliver the two solutions to the ramped dilution chamber and then to the mixing chamber. The color of the liquid in the mixing chamber was found to be uniform, indicating complete mixing had occurred.

EXAMPLE 3

Figure 3:
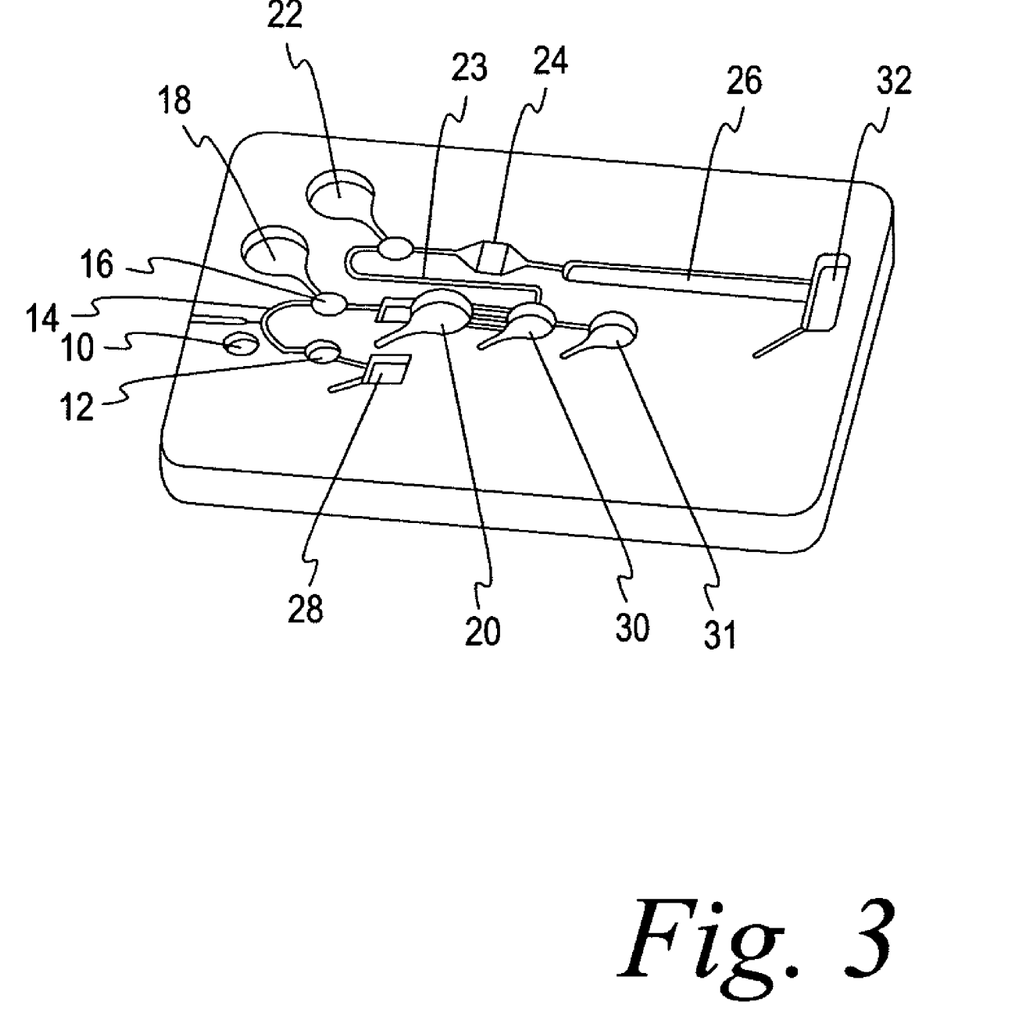
FIG. 3 illustrates a microfluidic device.

In this example, a test for HbA1c was carried out in a microfluidic chip of the type shown in FIG. 3. The surface energy of the internal features had been adjusted to provide a contact angle of 25° for water on the surface and were covered with a polypropylene film lid (Excel 2930). A sample of blood was introduced via sample port 10, from which it proceeded by capillary action to the pre-chamber 12 and then to metering capillary 14. The auxiliary metering well 16 is optional, only being provided where the sample size requires additional volume. The volume of the sample in capillary 14 and well 16 was 0.3 μL. The denaturant/oxidizing liquid (9.62 μL) (Sigma mammalian cell lysis/extraction reagent) was contained in well 18. It was emptied into the first chamber 20 (18.84 μL) at the same time the metering well 16 and the associated metering capillary 14 are emptied by application of centrifugal force by spinning at 1200 rpm at a distance of 29 mm to overcome the capillary stops (not shown). The first chamber 20 provided space for the blood sample and the denaturant/oxidant. The combined liquids were transferred through a set of three 2000 μm long capillary passageways having cross-sectional dimensions of 30 by 30 μm. The second chamber 30 received and mixed the liquids. As the force is removed the fluid exited from the top of chamber 30 into chamber 24 through capillary passageway 23. Excess liquids were transferred to waste well 31 by spinning at 2500 rpm at a distance of 43 mm.

Chamber 24 provided uniform contact of the preconditioned sample with labeled monoclonal antibodies disposed on a dry substrate and served as a second metering area. The volume of the sample in the capillary leading to chamber 24 was 2.0 μL. Contact of unbound labeled antibodies with the agglutinator, which was disposed on a substrate was carried out in chamber 26, producing a color which was measured to determine the amount of glycated hemoglobin in the sample. Application of a centrifugal force by spinning at 2500 rpm at a distance of 53 mm caused the incubated conjugate in chamber 24 and the wash buffer in chamber 22 to empty into chamber 26. The remaining wells provided space for excess sample (28), excess denatured sample (31), and for a wicking material (32) used to draw the sample over the substrate in chamber 26.

A 2 μL sample was pipetted into sample port 10, from which it passed through a passageway located within the chip (not shown) and entered the pre-chamber 12, metering capillary 14, and auxiliary metering chamber 16. Any excess sample passed into overflow well 28, which contains a wetness detector. No centrifugal force was applied, although up to 400 rpm could have been used. The sample size (0.3 μL) was determined by the volume of the capillary 14 and the metering chamber 16. A capillary stop at the entrance of the capillary connecting well 16 and the first chamber 20 prevented further movement of the blood sample until overcome by centrifugal force, in this example provided by spinning the chip at 1200 rpm. The denaturant/oxidant solution (Sigma mammalian cell lysis/extraction reagent) also was prevented from leaving well 18 by a capillary stop until 1200 rpm was used to transfer 10 μL of the denaturant/oxidant solution along with the metered blood sample into the first chamber 20 and thereafter into second mixing chamber 30. The volume of the first chamber 20 was about twice the size of the combined denaturant/oxidant solution and the blood sample. After mixing, 2 μL of the mixture leaves the second chamber 30 through a capillary and enters chamber 24 where microstructures assure uniform wetting of the substrate (a fibrous Whatman glass conjugate release membrane) containing the latex labeled monoclonal antibodies for HbA1c. Incubation was completed within a few minutes, after which the labeled sample was released to chamber 26 by raising the rotation speed to 2500 rpm to overcome the capillary stop (not shown) at the outlet of chamber 24. The labeled sample contacted the agglutinator (polyaminoaspartic acid HbA1c peptide) which was striped on a Whatman 5 μm pore size nitrocellulose reagent in concentrations of 0.1 to 3 mg/mL. The absorbent material (Whatman glass fiber membrane) in well 32 facilitated uniform passage of the labeled sample over the strip. While the labeled sample was released to chamber 26 at 2500 rpm, the buffer solution (phosphate buffered saline) left well 22 and passed through chamber 24 and over the strip in chamber 26 to improve the accuracy of the reading of the bands on the strip. The color developed was measured by reading the reflectance with a digital camera.

EXAMPLE 4

The chip of FIG. 3 was tested with two types of solutions. In the first test, a solution of phosphate buffer at pH4 was introduced as sample inlet 10, from which it was transferred to sample capillary 14 and well 16. Then, this solution was combined with the phosphate buffer at pH10 in chamber 18 in the first mixing chamber 20. It was found that mixing of the two buffer solutions was substantially complete in chamber 30 at a pH7 by dye measurement. When blood was the sample, a more viscous liquid than the buffer, mixing with a lysis buffer (lithium thiocyanate) from chamber 18 required use of both first chamber 20 and second chamber 30 of FIG. 3.

EXAMPLE 5

In order to simulate the mixing of blood with an aqueous buffer solution in a microfluidic device having the general configuration and design elements of FIG. 1, 25% of polyethylene glycol (PEG 20,000 mw) was added to a 0.5 N NaOH solution. The viscosity was approximately that of human blood. 10 μL (of the PEG/NaOH solution was added to well 10 and 100 μL of a pH4 buffer (50 mm phosphate) was added to well 14. Phenol red pH indicator was used to indicate the progress of mixing as the two solutions were combined in chambers 18 and 22. It was found that visually the liquids tended to appear as separate liquids while under higher applied centrifugal force, but that complete mixing occurred when the centrifugal force was reduced.

From a series of similar tests, it was concluded that there was no significant difference in mixing efficiency between the chip with one and four capillaries, between chips with rectangular and cylindrical receiving chambers, between chips with and without ramp structures, and complete mixing of viscous fluids is possible.

EXAMPLE 6

The efficiency of lysing blood with a buffer was tested by centrifuging diluted samples of the mixed blood and buffer and by examining the mixed blood and buffer with a Bayer occult blood reagent pad. If the lysis is incomplete, red pellets of blood form in the centrifuge or dark green spots appear in the occult blood pad. For comparison, solutions of 50 μL blood and 500 μL diluted or undiluted lysing buffer (lithium thiocyanate) were incubated for 3 minutes and then spun in a centrifuge at 1300 rpm for 10 minutes. Then, the solution was diluted 100 fold in phosphate buffer saline solution (pH7.0) and centrifuged again at 1300 rpm for 10 minutes. Mixing of blood in the lysing buffer in a microfluidic device was carried out, after which the mixture was taken from the mixing chamber and diluted 100 and 10,000-fold in phosphate buffer and test by the centrifugation and occult blood reagent methods. It was found that the blood had been substantially completely lysed in the microfluidic device.

A further study showed that the lysis of blood occurred almost instantly during the mixing provided in the microfluidic device.

What is claimed is:

1. A method of mixing predetermined volumes of two or more liquids in a microfluidic device comprising:
 (a) dispensing each of said liquids into a well determining the predetermined volume of said liquid to be mixed;
 (b) discharging the predetermined volume from each of said wells through separate capillary passageways into a first chamber to begin said mixing, said first chamber having a volume greater than the sum of said predetermined volumes, thereby providing free space in said first chamber;
 (c) discharging the said sum of said predetermined volumes from said first chamber into a second chamber via at least one capillary passageway to complete mixing of said predetermined volumes, said second chamber having a volume greater than said sum of said predetermined volumes, thereby providing free space in said second chamber.

2. A method of mixing liquids of claim 1 wherein said combined liquid volume of (a) is discharged into said second chamber through two or more separated capillary passageways.

3. A method of mixing liquids of claim 2 wherein said combined liquid volume of (a) is discharged into said second chamber through at least three separated capillary passageways.

4. A method of claim 3 wherein three or more separated capillary passageways are in liquid communication between said first and second chambers.

5. A method of mixing liquids of claim 1 wherein said combined liquid volume of (a) discharged into said second chamber is discharged into at least a third chamber through one capillary passageway or via two or more separated capillary passageways.

6. A method of claim 1 wherein said combined liquid volume of (a) is discharged into said second chamber in the form of droplets.

7. A method of claim 1 wherein said first chamber has a volume of at least about twice that of the combined liquid volume of (a), thereby providing free space in said first chamber.

8. A method of claim 1 wherein said second chamber has a volume of at least about twice that of the combined liquid volume of (a), thereby providing free space in said second chamber.

9. A method of claim 1 wherein a space of at least 100 µm is provided above the level of the combined liquid volume of (a) in the first chamber, thereby providing sufficient free space to allow liquid entering said first chamber to separate into droplets.

10. A method of claim 1 wherein a space of at least 100 µm is provided above the level of the combined liquid volume of (a) in the second chamber, thereby providing sufficient free space to allow liquid entering said second chamber to separate into droplets.

11. A method of claim 1 wherein at least one of said first and second chambers contains steps or ramps to assist mixing of said combined liquids.

12. A method of claim 1 wherein said combined liquid volume of (a) in said at least one capillary passageway is discharged into said second chamber with a velocity of at least 1 mm/sec.

13. A method of claim 1 wherein said first and second liquids are dispensed from said first and second liquid wells at the same time into said first chamber through capillary passageways.

14. A method of claim 1 further comprising moving said completely mixed combined liquid volume of (a) to downstream chambers for further processing.

15. A microfluidic device in which predetermined volumes of liquids are mixed comprising:
(a) a first well having a first predetermined volume and a second well having a second predetermined volume, said wells being adapted to hold said predetermined volumes of liquids before mixing;
(b) a first chamber having a volume larger than the combined volumes said first and second wells, said first chamber being in communication with said first and second wells through separate capillary passageways;
(c) a second chamber for complete mixing of said predetermined volumes of liquids, said second chamber having a volume larger than the combined volumes of said first and second wells and in communication with said first chamber through one capillary passageway or via two or more separated passageways.

16. A microfluidic device of claim 15 wherein said first and second chambers are in communication through two or more separated capillary passageways.

17. A microfluidic device of claim 16 wherein said first and second chambers are in communication through at least three separated capillary passageways.

18. A microfluidic device of claim 16 wherein said two or more capillary passageways have different diameters.

19. A microfluidic device of claim 16 wherein said two or more capillary passageways are disposed so as to cause liquid streams or droplets exiting from said passageways to impinge as said liquid streams or droplets enter said second chamber.

20. A microfluidic device of claim 16 wherein said two or more capillary passageways are manifolded before entering said second chamber.

21. A microfluidic device of claim 15 wherein said second chamber is in communication with at least a third chamber through one capillary passageway or two or more separated capillary passageways.

22. A microfluidic device of claim 15 wherein said first chamber has a volume of at least about twice that of the combined volume of said first and second wells.

23. A microfluidic device of claim 15 wherein said second chamber has a volume of at least about twice that of the combined volume of said first and second wells.

24. A microfluidic device of claim 15 wherein a space of at least 100 µm is above the level of said combined first and second wells in the first chamber.

25. A microfluidic device of claim 15 wherein a space of at least 100 µm is above the level of said combined first and second wells in the second chamber.

26. A microfluidic device of claim 15 wherein said capillary passageways have cross-sectional dimensions of 1 to 2000 µm.

27. A microfluidic device of claim 26 wherein said capillary passageways have cross-sectional dimensions of 200 to 1000 µm.

28. A microfluidic device of claim 15 wherein said capillary passageways have lengths of 0.5 to 100 mm.

29. A microfluidic device of claim 28 wherein said capillary passageways have lengths of 1 to 50 mm.

30. A microfluidic device of claim 15 wherein three or more separated capillary passageways are in communication between said first and second chambers.

31. A microfluidic device of claim 15 wherein at least one of said first and second chambers contains microstructures to assist mixing.

32. A microfluidic device of claim 15 wherein said passageways have hydrophilic surfaces.

* * * * *